May 28, 1935.  E. B. HUDSON  2,002,982
SELF ADJUSTING VALVE OPERATING TRANSMISSION DEVICE
Filed March 25, 1932   2 Sheets-Sheet 2

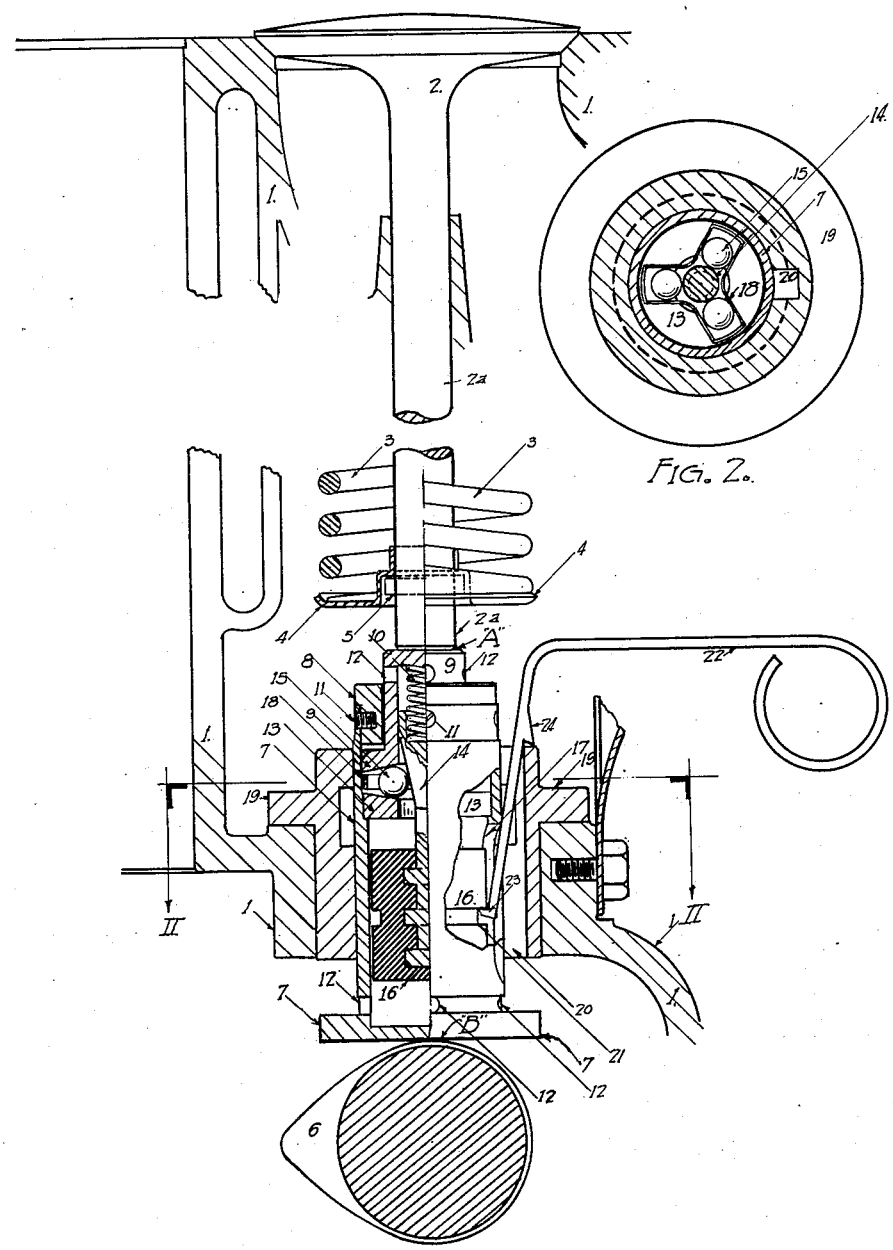

INVENTOR,
Edwin B. Hudson
BY Allen & Allen
ATTORNEYS.

Patented May 28, 1935

2,002,982

UNITED STATES PATENT OFFICE 2,002,982

SELF-ADJUSTING VALVE-OPERATING TRANSMISSION DEVICE

Edwin B. Hudson, Middletown, Ohio

Application March 25, 1932, Serial No. 601,224

14 Claims. (Cl. 123—90)

My invention relates to mechanisms for operating the valves of internal combustion engines, and more especially to the parts of such mechanisms that transmit the motion of the valve actuating elements, usually cams, to the valves. As the valve and cam are spaced apart by the engine cylinder which is subject to its interior operating temperatures, and the transmission part of the mechanism is subject to the much cooler and differently varying outside temperatures, there is such variation in the effective length of the transmission part and length of cylinder from time to time in the course of engine operation, that material variations from the intended valve seating and valve opening occur, for which compensation cannot be made by the ordinary adjusting devices. The usual practice has been to allow a clearance between the tappet and stem, as a compromise, of from .007" in automotive engines to as much as .040" in aircraft engines, which results in an incomplete closure of the valve or else improper timing and incomplete valve opening, as the clearance is reduced or increased under the varying temperature conditions.

It is an object of my invention to provide such automatic adjustment as to compensate substantially constantly for these varying conditions so that no compromise clearance is necessary, and so that there is substantially complete seating of the valve at every operation, without disturbance of the engine timing and without curtailing the valve opening operation at any time, thereby avoiding leakage at imperfectly closed valves and maintaining volumetric efficiency at open inlet valves and freedom of exhaust at open exhaust valves, all of which of course contributes to the attainment of the full efficiency which the engine is designed to have.

A further object is to provide for the above automatic adjustment by simple means readily introduced into existing engine designs. A further object is to have such a simple means self contained, as a unit, and to have most of the operating parts thereof enclosed and compactly arranged.

A further object is to provide against disturbance of the length of the device incident to release thereof from operating pressure, as when repairs are to be made or the valve seats are to be ground.

Other objects will appear in the course of the following description, illustrated by the accompanying drawings, in which—

Figure 1 is a fragmentary sectional view of an engine cylinder block and tappet guide, with a cam shaft in cross section and a valve and parts of its stem in elevation, part of the valve spring and its valve stem bearing means being shown, together with my improved device as embodied therewith, half in section and half in elevation, and showing an instrument in elevation, applied to the device in operative position;

Fig. 2 is a horizontal cross section on the plane of the line II—II of Fig. 1, showing the locking balls and their cage in plan;

Figure 3:
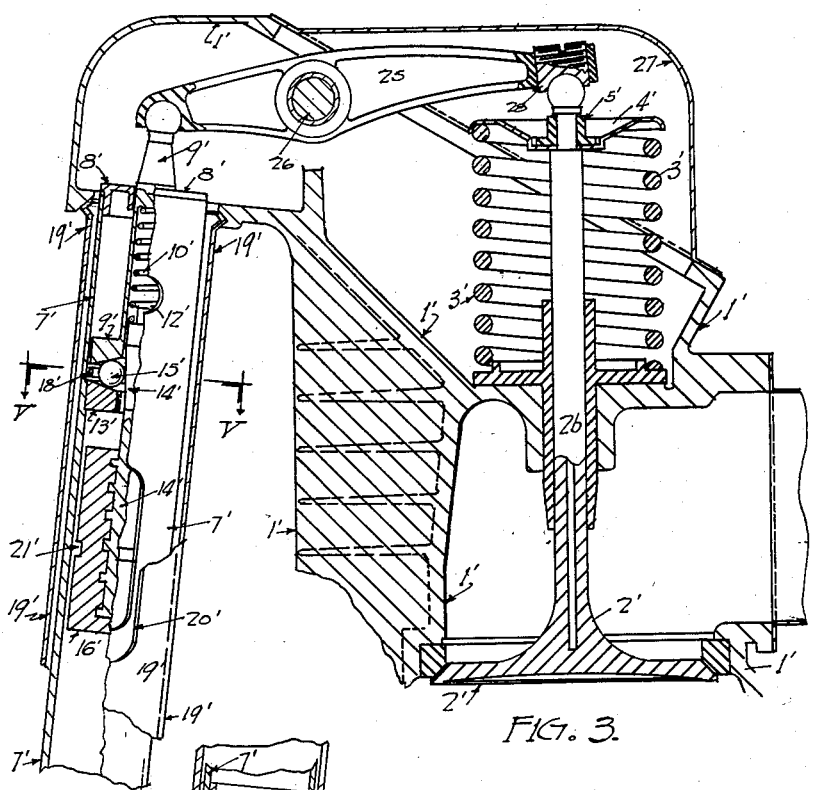
Fig. 3 is a fragmentary sectional view of an engine of a different type with a modification of my invention embodied therein, of which the upper part only is shown.

In the first example, Figs. 1 and 2, my invention is shown as incorporated in the valve operating mechanism of a typical L-head automotive engine, with the cylinder block 1 having the seat for the valve 2 with stem 2a extending down toward the cam and tappet devices, with a spring 3 understood to abut its upper end against a part of the cylinder block not shown, and abutting its lower end against the washer 4 seating on a pin 5 through the stem 2a. These are the usual parts, as also are the cam shaft and the cam 6.

Taking the place of the usual tappet is my improved tappet device comprising the lower tappet member 7 which has the usual broad base bearing on the cam 6, and from the base upward is tubular, with its upper end open and having secured therein a relatively thick short sleeve 8. The upper tappet member 9 has an inverted cup-shaped body extending through the sleeve 8, below which it has its lower end annularly extended with a concave conical lower surface. The top of this upper tappet member 9 engages the lower end of the valve stem 2a, and within the cup-shaped body is the helical spring 10. The sleeve 8 is shown as secured in the lower tappet member 7 by screws 11; but it will be understood that this sleeve may be more permanently secured, as by flash welding. Next to its base the lower tappet member 7 has vents 12 which prevent air cushioning of the interior operating parts of the tappet device, and also may admit an oil mist from the engine interior to lubricate those parts. The upper part of the tubular body of the lower tappet member 7 is of enlarged interior diameter, leaving a shoulder down against which is seated a ring 13 with a concave conical upper surface facing the lower surface of the upper tappet member 9 which is guided in the enlarged diameter of the lower tappet member 7. These tappet members 7 and 9 thus have a telescopic relation, and the concave conical surfaces, facing each other, converge radially outward.

The wedging member 14 comprises a short cylindrical upper end part with a central upwardly opening socket receiving the lower end of the spring 10 and with its exterior slidingly fitting the interior of the cup-shaped body of the upper tappet member 9. Below this cylindrical part the wedging member 14 is conical, tapering downwardly, to a stem-shaped lower end part. Locking elements 15, which preferably are steel balls, are held between the conical faces of the upper tappet member 9 and lower tappet member ring 13 by the wedging member 14. The ring 13 will be understood to be fixed in its seated position in the tappet member 7, as by pressing it into the bore thereof. The stem-shaped lower end part of the wedging member 14 has fixed on it a weight 16 freely movable in the lower part of the interior of the lower tappet member 7. This weight 16 preferably is of lead, cast onto the wedging member stem, which preferably has annular flanges to insure rigid attachment of the weight to the stem. One side of the lower tappet member 7 has a longitudinal slot 17 alongside this weight 16. The balls or locking elements 15, which as here shown are three in number but of course may be of greater number, are held in substantially equally spaced relation around their annular conical seats by a cage 18, as best seen in Fig. 2.

The lower tappet member 7 has its tubular body guided in the usual tappet guide 19 which fits in the engine block in the usual manner. For my purpose it has an internal longitudinal groove 20 which, when the lower tappet member 7 has its slot 17 in registry therewith, allows access from the top of the tappet guide 19 to the weight 16, which has an annular groove 21 around it. The instrument 22 has on its lower end a hook lug 23, and some distance up, it has a shoulder 24 to bear on the top rim of the tappet guide 19 while the lug 23 engages under the upper edge of the weight groove 21 to hold the weight and wedging member 14 up under certain conditions as will later be described.

Figure 4:
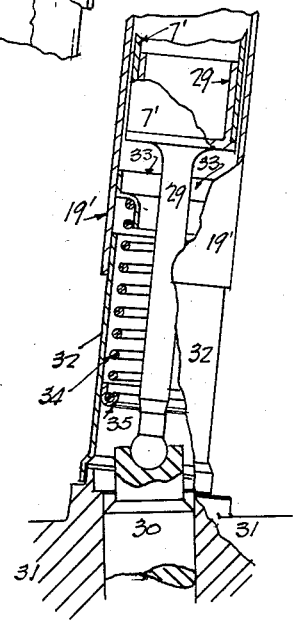
Fig. 4 is a sectional elevation of the lower part of the example of my invention shown in Fig. 3, a cam tappet and part of the engine casing being shown.
Figure 5:
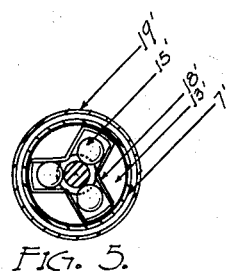
Fig. 5 is a transverse cross section of the device on the plane of the line V—V of Fig. 3.

In the example of Figs. 3, 4 and 5, my invention is shown in modification as applied in a typical air-cooled radial (static) air-craft engine of overhead valve design involving the use of the rocker arm 25 on fulcrum 26 within a casing 27 and having the usual adjustable ball connection to the upper end of the stem 2b of the valve 2' seating upwardly in the cylinder block 1' under action of springs 3' against washer 4' held by collar 5' on stem 2b, and seating down on top of the valve chamber. Fig. 4 will be understood to be the lower continuation of the view of Fig. 3, and shows the stem 29 having at its lower end a ball connection with the tappet 30 guided in the casing tappet guide 31 and understood to engage with a cam, not shown, in the casing. My invention in this case is incorporated in a device which takes the place of the usual valve rod, with tappet members 7' and 9' additional to the tappet 30 of the engine.

The lower tappet member 7' is a tube which has its lower end (Fig. 4) embracing and fixed to the enlarged cup-shaped upper end of the stem 29 that engages the engine tappet 30. The casing tube 19' encloses the member 7' and its lower end part surrounds the upper end part of a smaller casing tube 32. The upper casing tube has an interior ledge 33 and a helical spring 34 surrounding the stem 29, is compressed between this ledge 33 and a ledge 35 on the interior of the lower casing tube 32. This spring keeps the upper tube 19' up against the bottom of the casing extension at the top, and keeps the lower tube 32 down against the tappet guide 31 at the bottom. The lower tappet member tube 7' has a longitudinal slot 17'; and the upper casing member 19' has a slot 20' registering with the slot 17', permitting access to the interior of the member 7'.

The upper end part of this upper tappet member 7' is enlarged, forming a shoulder, and the ring 13' is pressed therein against the shoulder. The upper tappet member 9' has a tubular body with its top closed and having an upward extension having a ball connection with the rocker arm 25. This tubular body extends through a sleeve 8' fixed in the top of the lower tappet member 7', and the bottom of the upper tappet member 9' is enlarged, slidingly fitting in the enlarged bore of the lower member 7' and having its bottom of concave conical shape and facing the like shaped upper face of the lower member ring 13'. The three locking members or balls 15' are held between these outwardly converging surfaces by the wedging member 14' and are kept properly spaced by the cage 18' as shown in Fig. 5. The helical spring 10' is held between the cylindrical top part of the wedging member 14' and the closed top of the upper tappet member 9', the cylindrical part slidingly fitting the interior of this member. Below the conical part, downwardly tapering, of the wedging member 14', which conical part holds the balls 15' out between the converging surfaces, is the bottom stem with the lead weight 16' fixed thereto and loosely occupying the part of the tubular lower tappet member 7' just below its ring 13', with an annular groove 21' around it within the limits of the tappet member and casing slots 17' and 20', where it may be reached through these slots for holding the weight 16' and wedging member 14' up, under conditions to be described. The bottom of the casing extension at the top of the casing tube 19' has an opening coextensive with the opening of the top of this tube, admitting the tappet members freely to the casing for the connection to the rocker arm 25 as above described. It will be seen that, although the form and proportions of its parts vary from those of the parts in Figs. 1 and 2, this example of Figs. 3, 4 and 5 is the same in principle of construction as the previous example.

*Operation.*—In the example of Figs. 1 and 2, the self-adjusting tappet device is constrained in length by being held between the cam 6 and the valve stem 2, held down by the valve spring 3. In Figs. 3 and 4, the self-adjusting tappet device is similarly constrained between the engine tappet 30 held up by the cam, not shown, and the outer end of the rocker arm 25 held down by the spring 3' holding the other end up.

Referring to the example of Fig. 1, the wedging member 14 is held down by force of gravity on it and its weight 16, and by the force of the spring 10. These forces are not sufficient to move the wedging member 14 downwardly and displace the balls 15 outwardly to lengthen the device against the pressure of the valve spring 3.

As the lobe of the cam 6 raises the tappet device, rod 2a and valve 2, the inertia of the wedging member 14 and weight 16 to starting will increase the pressure of the wedging element 14 against the balls 15, so that, with the angles of the three wedging surfaces of member 9, ring 13 and member 14 being as shown, the resistance of the valve spring 3 cannot overcome these forces and move the balls 15 inwardly to shorten the device. Consequently the balls 15 are clamped between the three surfaces and the effective length of the transmission assembly is maintained in the raising of the valve 2. This increased pressure gradually dissipates as the inertia is overcome during the lift stroke until, (when the nose of the cam 6 has completed the lifting of the tappet device, stem and valve, and these stop suddenly under the resistance of the valve spring 3), the member 14 and its weight 16 have acquired a momentum, or inertia to stopping, which raises the wedging member 14 relatively to the balls 15, against the pressure of the wedging member spring 10. As the nose of the cam passes down away from the tappet device, it, together with the stem 2a and the valve 2, moves downward; and now the inertia of the member 14 and its weight 16 to starting downward maintains the rise of the wedging member 14 relative to the balls 15.

The result of the above action is that at the instant of reversal of the valve 2 at the end of its opening stroke the balls 15 are freed of the pressure of the wedging member 14, and under the action of the converging surfaces of the member 9 and ring 13 and their own inertia to reversal of travel with the device causing them to move up along the bottom of member 9, the balls 15 will move inwardly. This unlocks the tappet device from its length adjustment which it had between the seated valve 2 and the constant radius of the cam 6.

The inertia of the wedging member 14 and its weight 16 is overcome, assisted by the wedging member spring 10, in the downward valve-closing stroke of the parts, until, when the tappet device again reaches the constant radius of the cam 6, the wedging member 14 and its weight 16 have acquired momentum, or inertia to sudden stoppage with the tappet device, which is supplemented by the wedging member spring 10. The wedging member therefore will move down from its raised position relatively to the balls 15, again clamping the balls 15 between the converging surfaces of the member 9 and ring 13 at whatever radially outward displacement they may have in accordance with the spacing of these surfaces at the time of stoppage of the downward travel.

If expansion of the transmission parts, or contraction of the cylinder, or both, occurred, the upper tappet member 9 will be forced down in the lower tappet member 7 by the valve spring 3 until the valve 2 seats completely, and the device thus will be locked with the balls 15 not as far out as they were previously. If contraction of the transmission parts, or expansion of the cylinder, or both, occurred, the valve 2 will seat completely under the force of the valve spring 3, and the tappet device will expand and maintain its contact with the stem 2a and cam 6 under the action of the wedging member 14 moving the balls 15 outwardly as just above described. This locks the device in its new adjustment, ready for the next raising action of the lobe of the cam 6, when the inertia to starting will increase the locking pressure as before described, and the cycle will be repeated.

It will be seen, therefore, that my tappet device always is set and locked at complete valve-seating adjustment when it stops and starts, that is, reverses its travel, at the end of the valve-closing stroke, and always is released and unlocked when it stops and starts, that is, reverses its travel, at the end of the valve-opening stroke.

As this unlocking is accomplished only by this reversal, it cannot occur until the valve 2 has reached the full upward travel afforded it by the effective length of the transmission assembly, which is the length acquired with the valve 2 completely seated and the tappet device against the cam 6, modified only by whatever slight contractions or expansions could occur in the upward stroke just completed. This will not affect the valve opening materially, as would an accumulation of contractions, or expansions, during a number of strokes, as permitted without automatic adjustment at each valve operation, and without which it is necessary to provide a clearance between the stem and tappet to permit complete valve closing at miximum effective length of the transmission assembly, which necessarily results in incomplete valve opening with this maximum effective length, and less complete opening if this effective length decreases by temperature changes, as before explained.

Of course, at lower engine speeds, the inertia of the weighted wedging device is less effective, and the increasing resistance of the valve spring 3 as it is compressed will overcome the resistance of the wedging device and unlock it before the upward stroke is completed. This will not appreciably occur, with the design as shown, with engine speeds of approximately 200 R. P. M. upward. For engine speeds below approximately this speed, the loss is only from .008″ to .010″, for example reducing a designed valve lift of .3125″ to .3117″ or .3115″, which has no detrimental effect on the efficiency as the engine is throttled at such low speeds, and a much less valve lift would be ample. At speeds with little or no throttling, requiring maximum valve opening, the inertia will be effective to prevent appreciable shortening of the assembly, and there will be practically no loss of valve lift.

Without automatic adjustment, the necessary arbitrary tappet clearance reduces the valve lift throughout the speed range, with curtailed volumetric efficiency and power output at the higher speeds.

My device is very different from devices which have employed a spring and wedging means to increase the length of assembly and take up clearance. This is because inertia is utilized, and the device has a cycle of operation with three distinct phases, (1) the reset phase during revolution of the cam with constant radius contact with tappet, 180 deg. in the example herein, (2) the locking phase during valve lift contact of cam with tappet, 90 deg. herein, and (3) the unlocking phase during valve closure contact of cam with tappet, 90 deg. herein. The adjustment therefore is remade at each valve operation cycle, and shortening as well as lengthening may occur as conditions require.

Because of the release during each valve closure phase, allowing the transmission assembly to shorten from every setting, each setting in the valve lift phase is a setting of the shortened assembly, distinct from the previous setting. Therefore, there is no accumulative lengthening which would result in prevention of valve seating, and no accumulative shortening which would result in undue clearance between the tappet and the cam and valve stem.

When the valve spring 3 is released for grinding the valve 2 the upper tappet member 9 would be forced up by the downward action of the wedging member 14 and the device would lock in a lengthened condition when the spring is restored. To avoid this, the device is unlocked before the spring 3 is removed, by inserting the instrument 22 in the slot 20 of the tappet guide 19, engaging its hook lug 23 under the upper edge of the groove 21 in the weight 16, by which the weight 16 and wedging member 14 are lifted, releasing the balls 15 from locked position. The instrument 22 has its shoulder 24 hooked over the upper edge of the slot or groove 20, maintaining this release during the removal of the spring 3. When the spring 3 is restored and the engine started, the tappet device will have been locked at a short adjustment by the spring pressure applied before the instrument 22 is removed, and at the first up-stroke the device will be lengthened automatically to take up clearance, by normal operation of the self-adjusting means as has been described.

The operation of the device as shown in Figs. 3 and 4 will be understood from the foregoing description of the operation of the device of Fig. 1. The member 14' with its weight 16' operates, by inertia and momentum, to release and reset the balls 15' between the tappet members 7' and 9', and thereby maintaining the effective length of the transmission assembly made up of tappet 30, stem 29, lower tappet member 7', upper tappet member 9' and the balls 15' between the members, from the engine cam to the rocker arm 25. It is unnecessary to disturb the adjustment at 28 between the inner end of the rocker arm 25 and valve stem 2b, as any clearance developing here also will be taken up by my self adjusting tappet or rod, increasing its length from the cam to the outer end of the rocker arm 25 as that end rises relatively to the other parts incident to the relatively lower position taken by the inner end of this arm due to the clearance there. In like manner the device will compensate for changes in length of the valve stem 2b, which though relatively short is exposed to high temperature in the valve chamber. Therefore, the stem 2b and rocker arm 25 may be considered part of the transmission assembly of which the effective length is adjusted, along with the parts 30, 29, 7', 15' and 9'.

The device may be unlocked while valve springs 3' are removed, by an instrument inserted through slots 20' and 17', in a manner similar to that described for the device shown in Fig. 1. Openings 12' in the shell of the tubular lower tappet member 7' admit lubricant to the interior parts of the self-adjusting device, which may be part of the lubricant supplied to the parts in the casing 27. These openings also vent air from the device, preventing air cushioning of the parts. The tubes 19' and 32 completely enclose the device.

The wedging surfaces of the parts 7, 9 and 14 in Fig. 1, or 7', 9' and 14' in Fig. 3, may be hardened and ground to increase their durability and accuracy of operation.

From the foregoing description it will be seen that all changes in absolute and relative lengths of the parts are compensated for constantly and automatically as the changes occur, resulting in a quiet and efficiently running engine.

Although my invention is specifically illustrated and described herein, as embodied in engines of certain types, modifications may occur in practice, and the invention may be embodied in any machine where like conditions exist and uniformly efficient and noiseless operation is desirable.

What I claim as new and desire to secure by Letters Patent is:

1. A longitudinally reciprocating transmission device comprising longitudinally relatively movable members having opposed surfaces converging transversely to the line of relative movement of the members, a locking element between said surfaces, and a wedging member actuated incident to reversal of movement of the device at one end of its stroke for moving said locking element in the direction of convergence of said surfaces and actuated incident to reversal of movement of the device at the other end of its stroke for releasing said element from said surfaces.

2. A longitudinally reciprocating transmission device comprising longitudinally relatively movable telescoping hollow members having interior opposed surfaces converging radially outwardly, a locking element between said surfaces, and a wedging member inside said hollow members actuated incident to reversal of movement of the device at one end of its stroke for moving said locking element radially outwardly and actuated incident to reversal of movement of the device at the other end of its stroke for releasing said locking element to move radially inwardly.

3. A longitudinally reciprocating variable-length transmission device comprising locking means set to maintain effective length of the device, and released to allow change of effective length of the device, and means actuated incident to each reciprocation of the device, setting said locking means at one end of the stroke, and releasing said locking means at the other end of the stroke of the device.

4. A longitudinally reciprocating variable-length transmission device comprising locking means set to maintain effective length of the device, and released to allow change of effective length of the device, and inertia-actuated means setting said locking means as the device reverses its travel at one end of its stroke, and releasing said locking means as said device reverses its travel at the other end of its stroke.

5. A longitudinally reciprocating variable-length transmission device for operating an engine valve, comprising locking means set to maintain effective length of the device, and released to allow change of effective length of the device, and means actuated by inertia at reversal of travel of the device at the end of the valve-closing stroke to set said locking means, and actuated by inertia at reversal of travel of the device at the end of the valve-opening stroke to release said locking means.

6. A longitudinally reciprocating variable-length transmission device for operating an engine valve, comprising locking means set to maintain effective length of the device, and released to allow change of effective length of the device, and wedging means in controlling relation to said locking means and actuated by its inertia at reversal of the travel of the device at the end of the valve-closing stroke to set said locking means, and actuated by its inertia at reversal of travel of the device at the end of the valve-opening stroke to release said locking means.

7. A longitudinally reciprocating variable-length valve-operating transmission device comprising a tappet member and a valve-stem-engaging member relatively movable longitudinally, having opposed surfaces converging transversely to the line of relative movement of the members, a locking element between said surfaces, coacting therewith to determine the effective length of the device, and a wedging member free to reciprocate longitudinally relatively to said locking element by the inertia of said wedging member and having its wedging surface inclined to wedge said locking element in the direction of convergence of said surfaces by movement of said wedging member toward the tappet end of the device.

8. A longitudinally reciprocating variable-length valve-operating transmission device comprising a hollow tappet member and a valve-stem-engaging member movable longitudinally in said tappet member, said members having inside said tappet member opposed conical radially outwardly converging surfaces, a locking element between said surfaces, coacting therewith to determine the effective length of the device, and a conical wedging member tapering toward the tappet end of the device and free to reciprocate longitudinally of the device relatively to and in positioning relation to said locking element by the inertia of said wedging member.

9. A longitudinally reciprocatable variable-length valve-operating transmission device comprising a hollow tappet member and a hollow valve-stem-engaging member movable longitudinally in said tappet member, said members having inside said tappet member opposed conical radially outwardly converging surfaces, a locking element between said surfaces, coacting therewith to determine the effective length of the device, a conical wedging member tapering toward the tappet end of the device and free to reciprocate longitudinally in said hollow valve-stem-engaging member relatively to and in positioning relation to said locking element, and a spring compressed by said wedging element in said valve-stem-engaging member, tending to force said wedging member toward the tappet end of the device but allowing said wedging member to reciprocate by inertia of said wedging member.

10. A longitudinally reciprocating transmission device comprising a tubular tappet member with one end closed to engage operating means, and having the other end open, a ring fixed inside said member some distance inward from said open end and having a concave conical face toward said open end, a valve-stem-engaging member of cup shape with an annular extension on its rim fitting slidably in said tappet member between said ring and said open end, said annular extension having its face toward said ring of concave conical shape, balls between the two concave faces, a wedging member having one end slidable in said valve-stem-engaging member, extending through said ring and having a conical part tapering toward the tappet end of the device, a weight fixed on said wedging member in said tappet member between said ring and the closed end of the tappet member, and a spring compressed between said wedging member and the outer end of said valve-stem-engaging member, allowing said wedging member and its weight to reciprocate within the tappet member by the inertia.

11. A longitudinally reciprocating variable-length transmission device comprising locking means set to maintain effective length of the device, and released to allow change of effective length of the device, means actuated incident to reversal of movement of the device, at one end of its stroke, setting said locking means and actuated incident to reversal of movement of the device at the other end of its stroke for releasing said locking means, and means for releasing said locking means while said device is stationary.

12. A longitudinally reciprocating variable-length transmission device, means actuated incident to reciprocation of the device, controlling variation of the effective length of the device, said means tending to lengthen the device when the device is stationary and the length being limited by the associated elements between which the device transmits motion, said device comprising abutments on relatively movable parts thereof to receive spacing means for holding said means inoperative to lengthen the device while the pressure of one of said associated elements is removed from the device.

13. A longitudinally reciprocating variable-length transmission device comprising means in its interior to lock the device at various lengths, means relatively movable inside said device by its inertia to reciprocation of the device, to lock and unlock said locking means, a guide for said device having a groove interiorly next to said device and said device having an opening from said groove to said relatively movable means, whereby means may be inserted through said groove and opening to engage with said relatively movable means and said guide and hold said relatively movable means in position to unlock said locking means.

14. A transmission device adapted for longitudinal reciprocation and being made up of a plurality of parts relatively movable longitudinally of the device, and comprising means acting upon the several parts to lock them in various degrees of longitudinal adjustment relatively to each other, whereby the effective length of the device may be altered, and means movable on said device longitudinally thereof relative to said locking means by virtue of its inertia to reciprocation with the device, and engageable with and disengageable from said locking means to lock and unlock said locking means incident to the relative movement, permitting said effective length to alter in the course of reciprocation of the device, for the purposes set forth.

EDWIN B. HUDSON.